Jan. 17, 1933.                    E. EK                    1,894,307
                    MEASURING AND CONTROL APPARATUS
                         Filed May 20, 1926          5 Sheets-Sheet 1
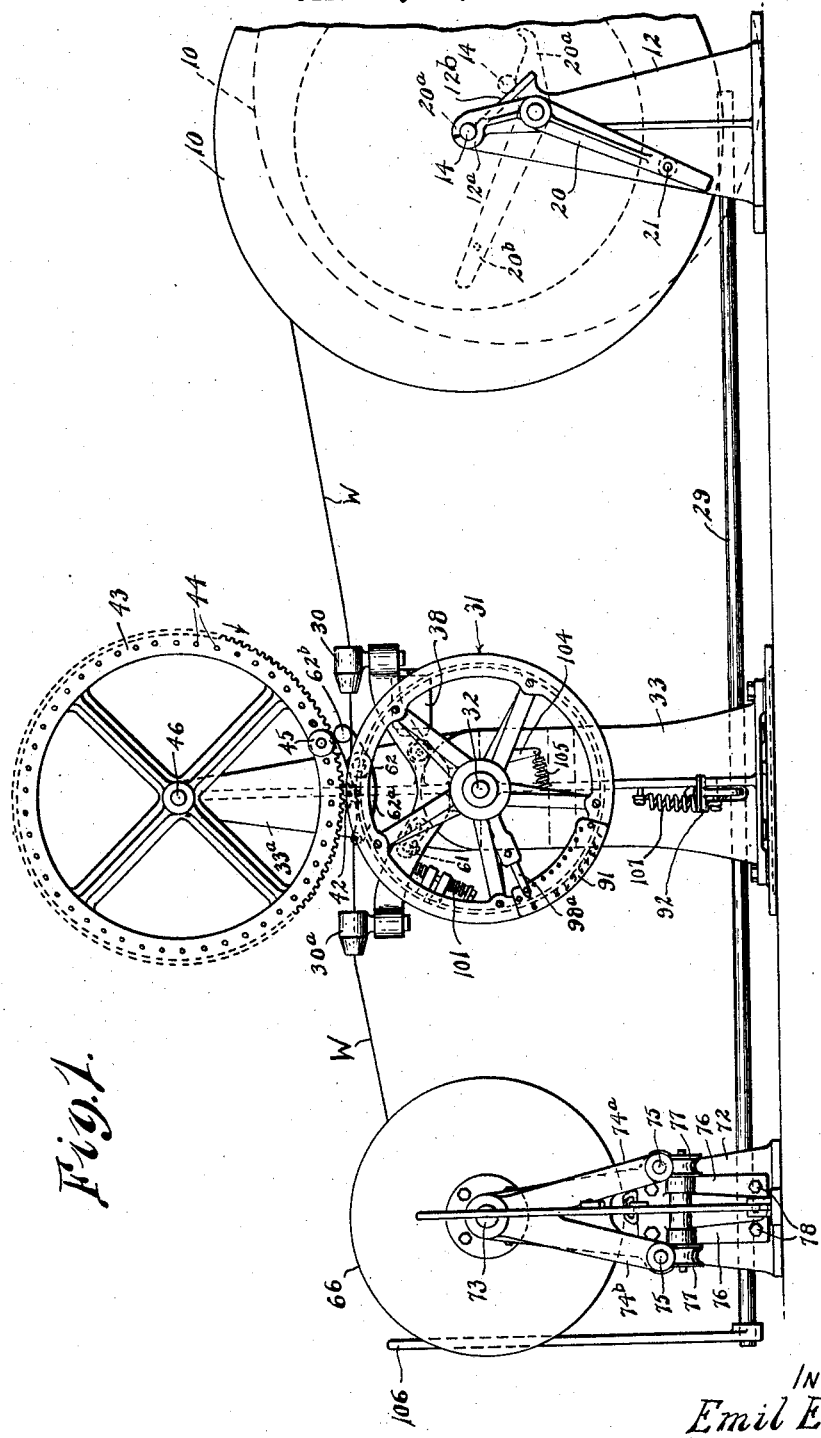
INVENTOR
*Emil Ek*
BY *Harry D. Peck*
ATTORNEY Jan. 17, 1933.  E. EK  1,894,307
MEASURING AND CONTROL APPARATUS
Filed May 20, 1926  5 Sheets-Sheet 2
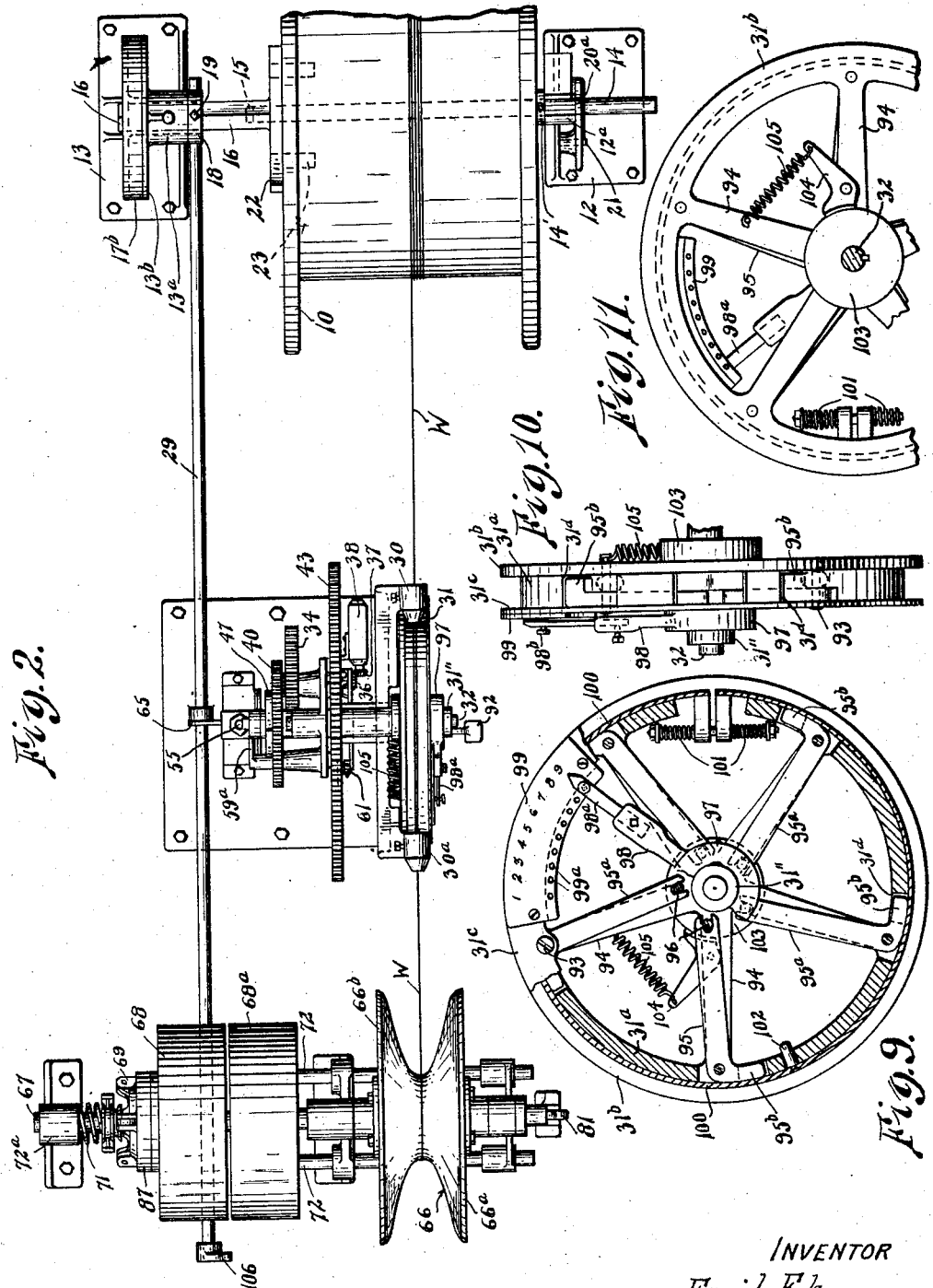
INVENTOR
Emil Ek
By Harry D. Peck
ATTORNEY Jan. 17, 1933.  E. EK  1,894,307
MEASURING AND CONTROL APPARATUS
Filed May 20, 1926  5 Sheets-Sheet 3

INVENTOR
Emil Ek
By Harry D. Peck
ATTORNEY

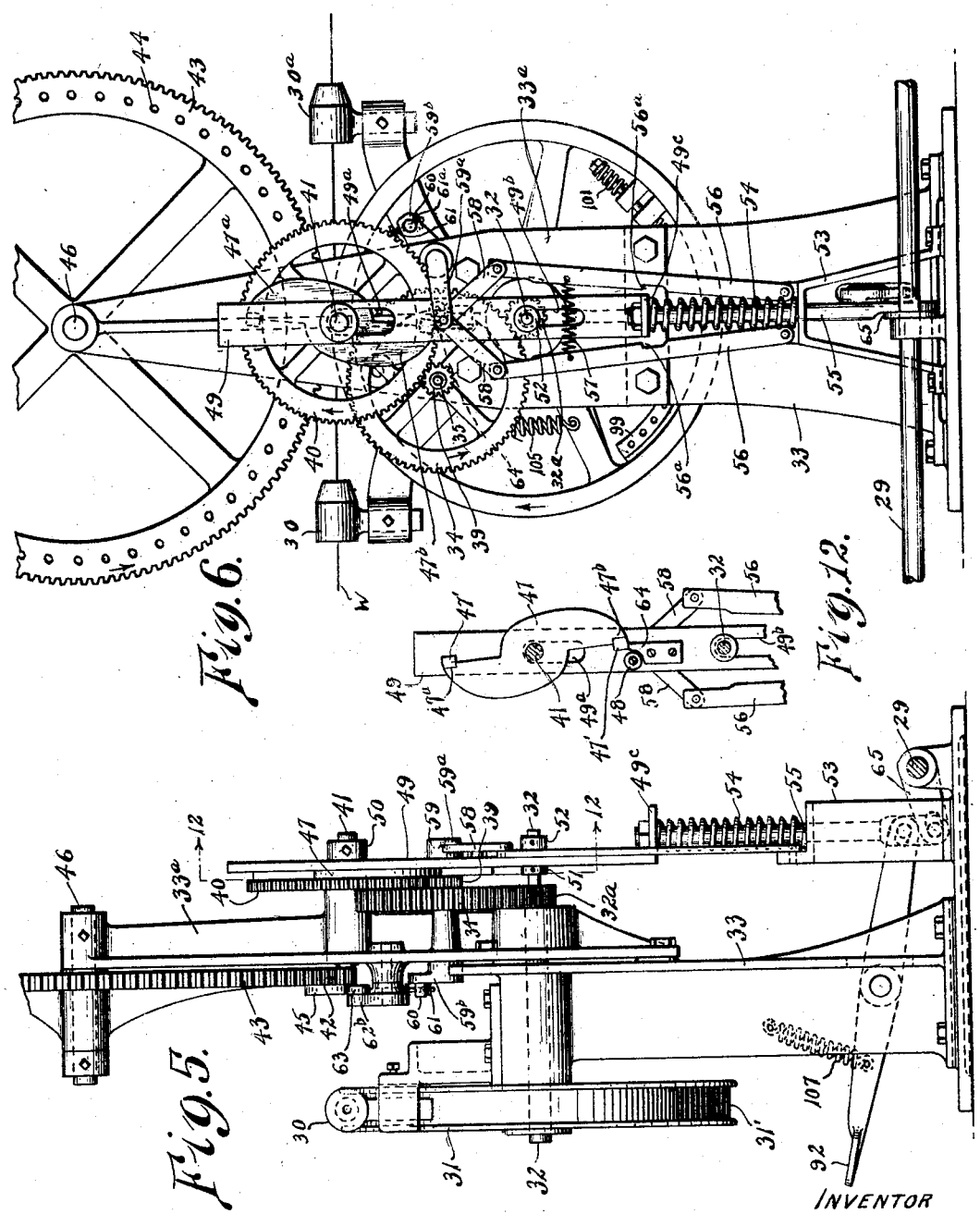

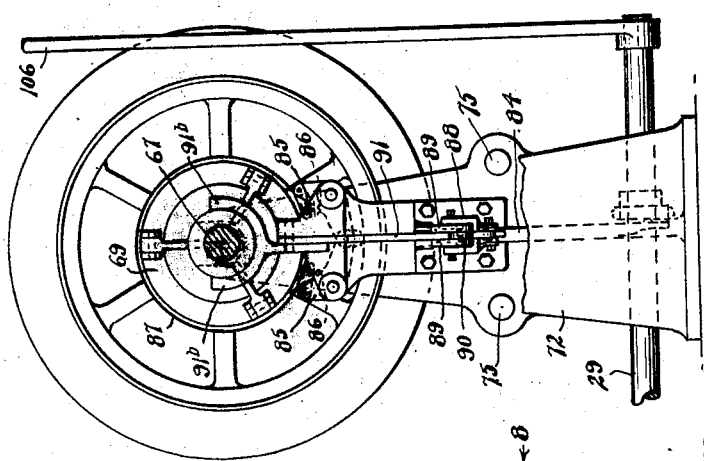

Patented Jan. 17, 1933

1,894,307

UNITED STATES PATENT OFFICE

EMIL EK, OF PORTLAND, MAINE, ASSIGNOR TO ADDE AND COMPANY, OF PORTLAND, MAINE, A CORPORATION OF MAINE

MEASURING AND CONTROL APPARATUS

Application filed May 20, 1926. Serial No. 110,431.

This invention relates to improvements in measuring and control apparatus. More especially it relates to apparatus for handling wire, cordage, thread, tape or any product of similar linear form. The apparatus herein shown and described is particularly adapted for use with wire, but this is to be taken as merely illustrative of one application of the principles involved and not in a limiting sense.

In handling wire or the like it is desirable that its linear extent be measured while the wire is moving, as for example. during its passage from the wire-making machine to the device which winds it on spools or in coils and that the movement of the wire be stopped when a predetermined length has ben measured. The provision of apparatus capable of measuring wire during its travel and capable of controlling its movement is an object of the present invention. Other objects are to provide a measuring and control unit that is operated by the movement of the wire itself and to provide operative connections between this unit and both the source of supply and the device to which the measured wire is delivered so that when a predetermined length has been measured by the unit its control mechanism will operate through the connections to stop the supply and the delivery device. Where the latter is a power driven unit, it is a feature of the invention that the control mechanism both disconnects the power and applies braking means.

In the best mode in which I have contemplated applying the principles of my invention the wire is looped around a rotatable member and, in its travel, causes rotation of this member to effect operation of the measuring and control apparatus. It is therefore a further object of the invention to provide a rotatable member whose effective surface in contact with the wire can be adjusted in extent so that wires of different diameters can be handled and their differences in size be compensated for by adjustment of the said surface to the end that a precise of length of wire will be measured irrespective of its size.

In the illustrative embodiment of the invention shown herein I have represented the source of supply as being a spool of wire, and the delivery device as being a power-operated spool which draws the wire from the supply and winds it in a coil. Novel supporting means are provided for each of said spools and each is provided with control mechanism operatively connected with a measuring unit. The latter is located between the spools and has a wheel around the rim of which the wire is in contact during its transfer from one spool to the other. This rim is adjustable in extent to vary the peripheral dimension of the wheel so that when wires of different sizes are handled, the portion of wire encircling the rim will be of predetermined length regardless of its size. The rotation of the wheel, caused by movement of the wire, is transmitted to a tabulating device which records the length of wire drawn, and to control mechanism which operates automatically to stop the wire movement which in the illustrated apparatus is accomplished by a release of the power drive and an application of brakes to both the supply and winding spools. The control mechanism can be set to permit any desired length, within the limits of the apparatus, to be measured and when set for a particular length will operate to stop the apparatus when that exact length has been measured. Accordingly when the apparatus has been properly adjusted and set it can be left to its own devices with the assurance that when the desired length of wire has been drawn from the supply, the movement of the wire will be stopped without danger of more or less than the predetermined length being withdrawn.

It is intended that the patent shall cover by suitable expression in the appended claims whatever features of patentable novelty exist in the invention disclosed.

In the accompanying drawings:

Figure 1 is a front elevation of apparatus embodying the invention;

Figure 2 is a plan of the same;

Figure 5 is a side elevation of the measuring unit with the counter and beveled gears removed for clearness;

Figure 6 is a rear elevation of the same;

Figure 7 is a side elevation of a winding device;

Figure 8 is a rear elevation of the same, partly in section on line 8—8 of Figure 7;

Figure 9 is a front elevation, partly in section, of a measuring wheel having an adjustable rim;

Figure 10 is a side elevation of the wheel of Figure 9 but with the rim-band removed;

Figure 11 is a rear elevation of the wheel; and

Figure 12 is an elevation, taken as on line 12—12 of Figure 5, showing details.

Figure 4:
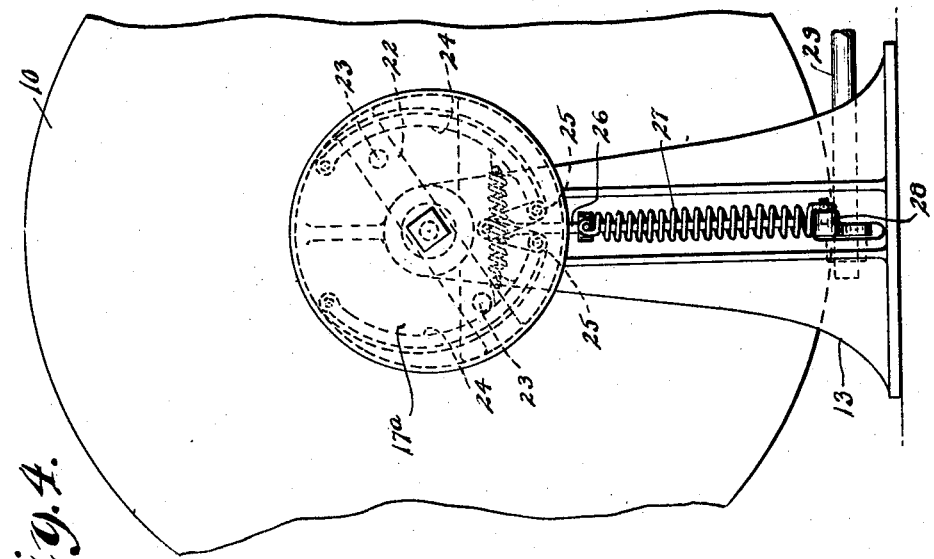
Figure 4 is a rear elevation of the same.

Referring to the drawings the wire $w$ to be measured and wound can be taken from any source, that shown herein being a large spool 10 mounted on standards 12 and 13 that support a shaft 14 which turns at one end in an open bearing 12$^a$ on the standard 12 and at the other end rests in a socket 15 provided in the end of a square shaft 16. This latter shaft is movable lengthwise through a sleeve 17 which turns within the bearing 13$^a$ of support 13, there being provision for locking the sleeve and shaft together by means of the collar 18 and set screws 19. In positioning the supply spool on its standards one end of the shaft 14 is placed in the socket 15 and the other end is brought over a hooked arm 20$^a$ of a hand lever 20 fulcrumed on the standard 12. At this stage the lever 20 will be in the position shown dotted in Figure 1 while the adjacent side of the spool rests on the floor with its shaft 14 over the hooked arm 20$^a$. By depressing the handle end 20$^b$ of the lever the spool shaft is raised and easily forced up the inclined track 12$^b$ on the standard 12 until finally brought into the open bearing 12$^a$ where it is held by the hooked arm 20$^a$, the handle end of the lever being locked to the standard 12 by the detent pin 21.

Figure 3:
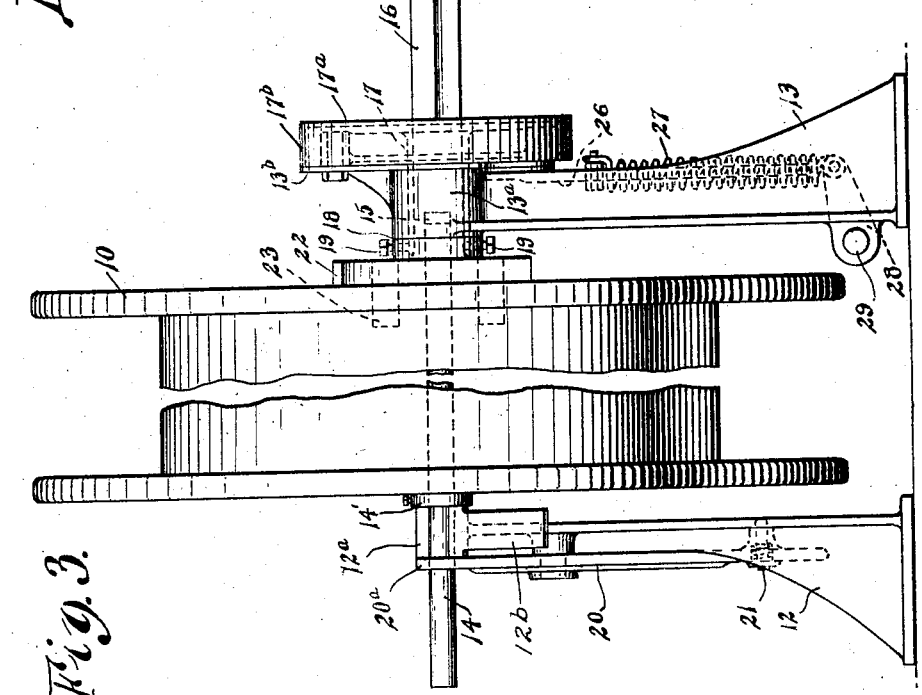
Figure 3 is a side elevation of a supply spool and its stand.

The square shaft 16 has a cross bar 22 at its end which rests against the supply spool and carries pins 23 for engaging holes in the spool side. As will hereinafter appear it is desirable to center the supply spool 10 with respect to the measuring wheel of the measuring unit and for this purpose shaft 16 can be slipped axially through the sleeve 17 to accommodate narrow or wide spools, the shaft 14 being similarly movable with respect to its open bearing 12$^a$. In Figure 2 a relatively narrow spool is shown, and the shaft 16 is closer to the standard 12 than in Figure 3 where a wider spool is shown and the shaft 16 is at its limit rearward. Collar 14′ can be clamped to shaft 14 by a set screw to prevent endwise movement of the shaft away from its socket 15 in shaft 16, and if a very narrow spool were used, a similar collar would be secured on shaft 14 close beside the spool to keep it against the cross bar 22.

The sleeve 17 terminates in a disk plate 17$^a$ having a flange 17$^b$ projecting toward a plate 13$^b$ attached to or integral with the bearing hub 13$^a$. On the latter plate are pivotally mounted braking bands 24 whose free ends are connected by links 25 with a vertical rod 26 which in turn is connected by a coiled spring 27 with a crank 28 secured to a horizontal rod 29. When this horizontal rod and crank are rotated, as will later appear, the spring pulls the rod 26 downward and forces the brake bands against the flange 17$^b$ thereby stopping its rotation and the rotation of shaft 16 and supply spool 10.

The wire $w$ passes from the supply spool 10 through a guide 30 and one or more times around a measuring wheel 31 mounted on a shaft 32 journaled in the base 33 of the measuring unit, so that when the wire is pulled to the left as seen in Figure 1 the wheel will thereby be rotated counter-clockwise. If only one size of wire is to be handled by the apparatus the measuring wheel would have a simple grooved rim 31′ such as is illustrated in Figure 5 and its circumference would be of such length that when the wire is just looped around it the axial line of the wire would be a predetermined length, for example five feet. Accordingly one rotation of the wheel, with the wire moving with it, would mean that five feet of wire had been drawn from the supply.

The shaft 32 of the measuring wheel carries a pinion 32$^c$ which meshes with an intermediate gear 34 on shaft 35, on the opposite end of which is a beveled pinion 36 (see Figure 2) which, through a similar pinion 37, drives the main shaft of a counter 38. By proper selection of the gears and pinions already mentioned the counter can be operated to count five during each rotation of the measuring wheel thereby registering the fact that five feet of wire have been drawn from the supply. A small gear 39 beside gear 34 on shaft 35 (see Figures 5 and 6) transmits rotation to a large gear 40 on shaft 41 and a small pinion 42 fixed thereon. The latter pinion meshes with the toothed periphery of an index wheel 43 which, as illustrated, has fifty equally spaced holes 44 around its rim into which can be set selectively a stop pin 45. The ratio of the gearing thus far described, which forms the driving connection being the measuring wheel 31 and the index wheel 43, is such that it requires twenty rotations of the measuring wheel to turn the index wheel one-fiftieth of a rotation. That is the gear ratios are as follows: pinion 32ª to gear 34 is 1 to 5; pinion 39 to gear 40 is 1 to 8, and pinion 42 to wheel 43 is 1 to 25. Accordingly when the measuring wheel has turned around twenty times shaft 35 will have been rotated four times, shaft 41 will have rotated one-half a turn and the shaft 46 of the index wheel will have turned through one-fiftieth of a rotation. In other words twenty turns of the measuring wheel, corresponding to the passage of one hundred feet of wire, advances the stop pin a distance equal to the space between adjacent holes 44.

A cam 47 is attached to shaft 41 having two operating arms 47ª and 47ᵇ oppositely spaced and each adapted singularly to perform the function of the cam during a half rotation of its shaft. The cam face of each arm begins close by the shaft and curves outward at increasing distance from the shaft's axis until, when the maximum distance is reached, it terminates at the edge of a hardened steel block 47' which partly overlies the radial stretch of the arm back toward the axis to the beginning of the next cam face. While the cam is turning one of its cam faces acts upon a roll 48 mounted on a bar 49. This bar is suitably slotted at 49ª and 49ᵇ to allow shafts 41 and 32 to extend therethrough respectively, there being a collar 50 on shaft 41 and collars 51 and 52 on shaft 32 to keep the bar in position for its roll 48 to be engaged by the cam faces. At its lower end the bar has an arm 49ᶜ between which and a support 53 is a spring 54 coiled about a rod 55. This spring is a compression spring and tends constantly to urge the bar 49 upward against the shafts 32 and 41, but is gradually compressed as the cam revolves by one of the cam faces acting through the roll 48 and bar 49.

When the cam has turned to bring the outermost point of one of its blocks 47' against the roll 48 and the spring 54 is in its most compressed state, a pair of latch levers 56 pivoted at their lower ends to the support 53 are drawn together by a spring 57 so that suitable shoulders 56ª, provided about midway of each lever 56, engage the upper side of arm 49ᶜ and thus lock the bar down against the force of coiled spring 54. The upper ends of these latch levers 56 are connected by links 58 with an arm 59ª of a lever 59 which is journaled in and extends through the extension plate 33ª of the base 33. The other arm 59ᵇ of this lever 59 carries a pin 60 provided with a hole through which projects a rod 61 that is connected to the long arm 62ª of another lever 62 whose shorter arm 62ᵇ carries a roll 63. The weight of the longer arm 62ª normally holds the roll 63 in the path of the stop pin 45, so that when the rotation of the index wheel brings this pin into engagement with the roller 63, the lever 62 will be moved to pull the rod 61 through the pin 60 until a nut 61ª engages the pin. Thereupon, further movement of the index wheel and lever 62 swings the lever 59 to force the links 58 downward, thus spreading the latch levers 56 and disengaging them from the bar 49. The latter is not at once pushed upward by the coiled spring 54, however, because at the time the latch levers are disengaged, one of the cam blocks 47' will have passed the roll 48 and come into contact with a hardened steel block 64 mounted on bar 49 close beside the roll 48 and in position to engage with the cam face as the latter leaves the roll. The condition thus described is illustrated in Figure 6. As the cam continues its movement, the sharp edge of its hardened block 47' slips off the edge of block 64 and the bar 49 then jumps upward quickly under force of spring 54. The action of the cam is so timed in relation to the index wheel that whenever the latter through its stop pin and described linkage is acting to spread the latch levers the outermost part of a cam face will at that time be pressing on the roller 48 or block 64, thus overcoming the force of spring 54 and permitting the latch levers to be easily spread. If the stop pin has not reached the roll 63 when a cam arm is thus holding the bar 49 down, the latch levers will not be spread as described, but will be held together by the spring 57 ready to take up the task of holding down the bar as soon as the cam arm passes by the roll 48. The upward movement of the bar 49 lifts the rod 55 and turns crank 65 which is secured to the horizontal rod 29. In consequence the brake is applied to the supply spool 10 as earlier described and at the same time other means, hereinafter recited, are actuated to release the power and stop a winding device.

From the measuring wheel the wire passes through another guide 30ª and thence to a winding spool 66 which is preferably made of two shells 66ª and 66ᵇ which can be closed together to form a concave spool as shown. The shell 66ᵇ is fixed on the end of a shaft 67 on which is loosely mounted a pair of pulleys 68 and 68ª or other means by which connection can be made to a power source, not shown. Clutch mechanism 69 provided for operatively connecting the pulley 68 to the shaft 67 and, as shown, is constantly urged toward engaging position by a grooved collar 70 and coiled spring 71, mounted on shaft 67 between the clutch and a bearing 72ª of standard 72. This arrangement is not necessary, because it is contemplated that any suitable clutch mechanism can be employed and that both its engagement and disengagement can be effected positively, if preferred. When it is desired to adjust the apparatus and turn it over by hand, the driving belt (not shown) is thrown on loose pulley 68ª, thus in effect disconnecting the power entirely.

The other shell 66ª of the winding spool is attached to another shaft 73 supported in axial alignment with shaft 67 by a movable bracket 74 whose arms 74ª and 74ᵇ are mounted on two parallel rods 75 slidable in bearings 72ᵇ on the winding spool standard 72. A pair of bell-crank levers 76 pivotally supported on the side of the standard carry rollers 77 on which the bracket rods 75 can move when the bracket and the shell 66ª are withdrawn to permit removal of the wound wire. Provision is made for adjusting the angular setting of the bell crank by means of the studs 78 associated with their depending arms. When closed, the shells are locked together by a hook 79 which catches on a looped rod 80 secured to the standard 72. This hook is carried by a hand lever 81, connected by links 82 with the bracket arms 74ª and 74ᵇ, by means of which the shell 66ª is easily separated from the other shell.

When the rod 29 is turned by the action of spring 54 on crank 65 of the measuring unit to apply the brake to the supply roll, it also turns a crank 83. The latter has a slot 83ª that engages a stud on rod 84 to pull it downward. The upper end of this rod is connected by bell crank levers 85 and links 86 with a brake band 87 arranged on the drum of the clutch mechanism 69. About midway of the rod 84 is a stirrup or yoke 88 connecting it with a pair of levers 89 that are pivoted at one end on the standard 72 and carry between them at their other end a roller 90. Between the levers 89 is another lever 91, having a curved lower end which is engaged by roller 90 to swing the lever clockwise (as seen in Figure 7) about its pivot 91ª on the standard 72. The upper end of this lever 91 has forked arms 91ᵇ which engage the collar 70. Accordingly as the crank 83 is turned by the rod 29 the resulting downward movement of rod 84, acting through the levers 89 and 91 and collar 70, overcomes the spring 71 and permits disengagement of the clutch. The same movement of rod 84 applies the brake band 87 to the clutch drum to stop its rotation and, since the latter is splined to the shaft 67 in the usual manner, it is clear that rotation of this shaft and the winding spool 66 is also stopped.

Thus it follows that when a predetermined length of wire has been drawn from the supply spool 10 and its passage around the measuring wheel has effected a sufficient rotation of the index wheel to operate the control mechanism heretofore described, the power of spring 54 will be utilized to release the power connection (clutch 69) and apply the brake 87 to the winding spool and the brake 24 to the supply spool. This automatic stopping of the apparatus can be effected when any desired length of wire has been measured and wound by simply setting the stop pin 45 the proper number of holes ahead of the roller 63. If the operator desires to stop the apparatus at any other time, he may do so by stepping on foot lever 92 which is fulcrumed on the base 33 of the measuring unit and is connected to vertical rod 55. This forces this rod upward through the coiled spring 54 and turns the horizontal rod 29 to swing the cranks 28 and 83 to disconnect the power and apply the brakes. The stopping of the winding and supply spools is depended upon to stop the measuring unit and there is therefore no brake provided for this unit although obviously one could be provided and actuated as are those already described.

As was previously stated, if only a single size of wire is to be measured and wound the rim of the measuring wheel 31 will be of fixed extent. It is a feature of the invention however to prvoide a wheel having a rim whose length can be changed to compensate for wires of different diameters. Such a wheel is illustrated in Figures 1, 2, 6, and 9 to 11. In this wheel the usual rim 31ª is provided with one flange 31ᵇ, integral with the rim, and with another flange 31ᶜ which is a rim plate clamped to the rim proper 31ª by screws 93. These screws are threaded into the rim at the junction with the spokes 94 and serve also as pivots for adjusting levers 95, there being a lever for each spoke with arm 95ª extending along the spoke toward the hub 31″ to a forked end which engages a pin 96 carried by a collar 97 rotatable on the hub 31″. This collar also has a hand lever 98, with pointer 98ª, which projects radially from the wheel axis and overlies a scale plate 99 attached to the rim plate 31ᶜ. Holes 99ª in the scale plate receive a detent pin carried by the pointer 98ª and enables the latter to be locked at the desired setting on the scale which corresponds with the size of wire to be measured. The levers 95 also have arms 95ᵇ which swing within recesses 31ᵈ formed in the rim 31ª. When the pointer 98ª is at the hole "9" on the scale, the levers 95 will be positioned so that their arms 95ᵇ are flush with the surface of rim 31ª, but when the pointer is swung to the left, as seen in Figure 9, thereby rotating the collar 97 and turning the levers 95 about their pivots 93, the arms 95ᵇ will extend beyond the surface of the rim 31ª. This protrusion of the arms 95ᵇ causes a rim-band 100 to expand against the push of springs 101 which tend always to compress it. Accordingly, the effective extent of the rim surface of wheel 31 is increased. By a proper setting of the pointer 98ª on the scale 99 it is possible to provide a rim surface of such extent that the length of the axial line of a wire looped once around the wheel will always be five feet, assuming that to be the extent of rim surface for which the measuring unit is designed. The rim-band 100 is forced to revolve with the wheel by virtue of a pin 102 fast to it and engaged in a hole in the rim 31ª.

As previously stated the measuring wheel 31 is so mounted on the shaft 32 that rotation of the wheel counter-clockwise, as seen in Figure 1, will cause the shaft to rotate with it. Rotation of the wheel clockwise does not turn the shaft. This can be effected by either a pawl and ratchet connection or, as shown, by keying a collar 103 on the shaft 32 (see Figure 11) and pivoting a clutch lever 104 on one of the spokes 94 with its clutch shoe positioned against the rim of the collar. When the wheel turns counter-clockwise the shoe and collar are frictionally locked together, the spring 105 aiding in the locking, but when the wheel rotates in the opposite direction the shoe can slip along the collar without effecting a turning of the shaft 32.

After the control mechanism has operated and stopped the apparatus and the wound wire has been removed and the new end of the wire again attached to the winding spool 66, the operator pulls hand lever 106 to the left, as seen in Figure 7, thereby turning rod 29 against the force of spring 54 to release the brakes and permit the clutch to engage. A few turns of the measuring wheel will cause sufficient rotation of the cam to hold the spring 54 down and permit the operator to let go of lever 106. This hand lever can also be used for an emergency stop (as well as the foot lever 92) by pulling it to the right and thereby turning the rod 29 to set the brakes. The rod 29 is urged toward brake-off position by spring 107 connected between lever 92, and the base 33 of the measuring unit. The combined force of springs 107 and 27 is less than the force of spring 54, so that when the latter is released it forces the rod 55 upward against the pull of its opposing springs.

Although the apparatus has been described as it may be used with wire, it is obvious that cordage of all kinds could be handled as well as thread, tape and the like. Accordingly in the appended claims the word "wire" is to be taken as an inclusive term embracing any material capable of being measured by apparatus constructed in accordance with the principles of the invention.

I claim:

1. Apparatus of the character described comprising, in combination, a source of supply of wire; a pulling device for withdrawing the wire therefrom; a brake adapted to be applied to said pulling device to stop the wire movement; a rotatable member arranged between said source and said device and rotated by the withdrawn wire traveling over its rim; and means actuated by said member in accordance with the length of wire traveling over its rim, having operative connection with said brake and adapted upon withdrawal of a predetermined length of wire to operatively apply said brake to stop said pulling device.

2. Apparatus of the character described comprising, in combination, a source of supply of wire; a power-driven device for withdrawing the wire therefrom having a brake adapted, when applied, to stop said device; control mechanism interposed between said supply and said device having a member engaged by the wire during its withdrawal and thereby actuated in accordance with the length of wire withdrawn; and an operative connection between the control mechanism and said device; the said control mechanism being adapted upon withdrawal of a predetermined length of wire to operate through the said connection to release said device from its power drive and operatively apply said brake to said device and thereby stop withdrawal of the wire.

3. Apparatus of the character described comprising, in combination, a source of supply of wire; a power driven device for drawing wire therefrom having a clutch controlling its power connection and having a brake adapted, when applied, to stop said device; control mechanism connected with said device, having a member engaged by the wire during the passage of the wire from said source to said device and adapted to effect action of said control mechanism in accordance with the length of wire withdrawn; said mechanism being adapted upon withdrawal of a predetermined length of wire to effect release of said clutch and application of said brake.

4. Apparatus of the character described comprising, in combination, a source of supply of wire; a wire supplying device having braking means adapted to control it; means for withdrawing wire therefrom; control mechanism interposed between said device and said withdrawing means comprising mechanism actuated by the wire during its withdrawal; and an operative connection between said mechanism and the said braking means; the said control mechanism being adapted upon withdrawal of a predetermined length of wire to operate through said connection to stop the supply.

5. Apparatus of the character described comprising, in combination, a supply spool of wire; means for supporting said spool rotatably; a device for withdrawing the wire from said spool; a measuring unit interposed between said spool and said device having a rotatable member engaged by the wire during its travel from the spool to the device; and means actuated by said member, comprising operative connections with said spool, for measuring said wire and for stopping rotation of said spool when a predetermined length of wire has been measured.

6. Apparatus of the character described comprising, in combination, a spool of supply wire; means for supporting said spool rotatably comprising a shaft connected with said spool and having braking means therefor; means for withdrawing wire from the supply; and means, interposed between said spool and said withdrawing means, and actuated by movement of the wire in accordance with the length withdrawn for applying the braking means to stop said spool when a predetermined length of wire has been withdrawn.

7. Apparatus of the character described comprising, in combination, a source of supply of wire; a wire supplying device having a brake controlling its movements; a device for withdrawing wire from the supply having a brake controlling its movements; control mechanism interposed between said devices and actuated by the wire in accordance with the length withdrawn; and operative connections between said mechanism and both said brakes, whereby upon the travel of a predetermined length of wire from the supply said mechanism operates both brakes simultaneously and stops the wire movement.

8. Apparatus of the character described comprising, in combination, a device for supplying wire and a device for withdrawing it therefrom and braking means for each device; control means between said devices having a rotatable member arranged to be rotated by the wire traveling over its periphery; power storage means arranged to be charged with power by said member, and having operative connection with said braking means; and means actuated by said member in accordance with the length of wire withdrawn for effecting release of said power storage means upon the withdrawal of a predetermined length of wire, whereby the said power storage means operates through its connection with said braking means to stop the wire movement.

9. Apparatus of the character described comprising, in combination, a device for supplying wire and a device for withdrawing it therefrom and braking means for each device; control means between said devices having a rotatable member arranged to be rotated by the wire traveling over its periphery; a rod having operative connection with said braking means; a spring for moving said rod to apply said braking means; mechanism actuated by said rotatable member for compressing said spring; means holding it in compression; and other means actuated by said rotatable member in accordance with the length of wire withdrawn for releasing said compressed spring; the last said means being adapted to be set to effect said release when a predetermined length of wire has been drawn from the supply.

10. Apparatus of the character described comprising, in combination, a device for supplying wire and a device for withdrawing it therefrom and braking means for each device; control means between said devices having a rotatable member arranged to be rotated by the wire traveling over its periphery; a rod having operative connection with said braking means; a spring for moving said rod to apply said braking means; a bar arranged to compress said spring; a cam actuated by said rotatable member for moving said bar to compress said spring; means for locking said bar against movement when said spring is compressed; and means actuated by said rotatable member in accordance with the length of wire withdrawn and adapted to be set to effect release of said bar upon withdrawal of a predetermined length; the operation of the last said means and the cam being synchronized so that said bar is free to move when released by the releasing means.

11. A device for measuring wire having, in combination, a rotatable member arranged to be rotated by the wire traveling over its rim; and means co-related with the peripheral extent of the rim and actuated by said member for registering the length of wire so traveling; the said rim being adjustable in extent to compensate for different sizes of wire; the said member having a split rim band movable therewith and expansible radially to change the peripheral extent of the member; the said member having a lever pivoted on it on an axis parallel to the face of the rim, with one arm extending along the face of the rim and arranged to engage said band and with another arm extending toward the member's axis; and means for turning the last said arm to cause said face-arm to expand the rim band radially thereby to increase the peripheral extent of the member.

12. A device for measuring wire having, in combination, a rotatable member arranged to be rotated by the wire traveling over its rim; and means co-related with the peripheral extent of the rim and actuated by said member for registering the length of wire so traveling; the said rim being adjustable in extent to compensate for different sizes of wire; the said member having a split rim band movable therewith and expansible radially to change the peripheral extent of the member; a multiplicity of levers pivoted to the rim on axes parallel to the member's axis, each having an arm extending along the face of the rim in position to engage the rim band, and each having an arm extending toward the member's axis; means at the axis of said member having connection with all the last said arms whereby they can be moved together to alter the position of the face-arms and vary the position of the rim band with respect to the member's axis, whereby the peripheral extent of the member is varied.

13. A device for measuring wire having, in combination, a rotatable member arranged to be rotated by wire traveling over its periphery; a shaft upon which said member is mounted; registering mechanism driven by said shaft for indicating the length of wire so traveling; and means operatively connecting said member and said shaft adapted to permit rotation of the member in one direction without causing movement of said shaft and to lock said member and shaft together upon rotation of the member in the opposite direction.

14. Measuring and control apparatus for handling wire having, in combination, a spool with a supply of wire thereon; supporting means for said spool comprising standards; a shaft journaled in one standard having an end socket; a shaft journaled in said socket and in the other standard and carrying said spool; means on the socketed shaft engaging said spool whereby the spool moves with said socketed shaft; a brake engaging said socketed shaft; means for withdrawing the wire from said spool; control mechanism arranged to be engaged by the wire during its withdrawal and actuated thereby in accordance with the length of wire withdrawn; there being a connection between said mechanism and said brake whereby upon the withdrawal of a predetermined length of wire, the said mechanism operates to stop said socket shaft and thereby stop the rotation of the spool.

15. Apparatus for handling wire comprising in combination, a spool with supply of wire thereon; a shaft on which said spool is rotatable; a standard for said shaft having an open bearing; a lever on said standard adapted to engage said shaft when said spool is resting on the floor and to force it into said open bearing; there being means to lock said lever in position to retain said shaft in said open bearing.

16. Apparatus for handling wire comprising in combination, a spool with supply wire thereon; a shaft in which said spool is rotatable; a standard for said shaft having an open bearing; a track on said standard leading to said bearing; a lever pivoted on the standard having a hook arm for engaging said shaft when the spool is on the floor beside the standard, and for forcing said shaft along said track and into shaft bearing thereby raising the spool from the floor; and means to lock said lever in position to retain the shaft in the bearing.

17. Apparatus for handling wire comprising, in combination, a standard; a shaft journal in said standard and movable longitudinally in the direction of its bearing; a socket in one end of said shaft; a second standard spaced apart from the first said standard; a second shaft journaled in said second standard and in the socket of the first said shaft; a spool with supply of wire mounted on said second shaft; means on the first said shaft for engaging the spool whereby the spool and said first shaft turn together; means for locking said first shaft with respect to its bearing when it has been moved longitudinally therethrough to engage the spool; and a brake for said first shaft whereby its rotation and the rotation of the spool may be arrested.

18. A device for drawing and winding wire in rolls comprising, in combination, a split spool having two shells which together form a concave surface upon which the wire is wound in a roll; means for locking said shells together; means for driving them; and means for separating said shells to permit removal of the wound wire.

19. A device for drawing and winding wire in rolls comprising, in combination, a split spool having two shells which together form a concave surface upon which the wire is wound in a coil; a driving shaft upon which one of the shells is secured; a standard supporting said shaft; a second shaft upon which the other of said shells is mounted; a bracket movably mounted on said standard and supporting said second shaft; means for adjusting said bracket to keep said shafts in alignment; means for locking the shells together; and means for moving said bracket away from the standard to separate said shells.

20. A device for drawing and winding wire in rolls comprising, in combination, a split spool having two shells which together form a concave surface upon which the wire is wound in a coil; a driving shaft upon which one of the shells is secured; a standard supporting said shaft; a second shaft upon which the other of said shells is mounted; a bracket supporting said second shaft and mounted on rods movable in bearings in said standard; means for moving said rods and bracket to separate said shells; bell crank levers pivoted on said standard and carrying rolls upon which said rods roll in moving; and means for adjusting said bell cranks to maintain the said shafts in alignment.

21. Apparatus for withdrawing and winding a predetermined length of wire from a supply comprising a power driven spool to which the wire is secured and on which it is wound; a spool with supply of wire thereon; braking means for each spool; a measuring and control unit between said spools arranged to be actuated by the wire in passing from one spool to the other; and connections between said braking means and the unit; the said unit comprising mechanism arranged to be set to operate said brakes to stop said spools, when said predetermined length of wire has been withdrawn.

22. Apparatus of the character described comprising, in combination, a source of supply of wire; a wire supplying device having braking means adapted to control it; means for withdrawing wire therefrom; and control mechanism interposed between said supply device and said withdrawing means engaged by said wire and actuated thereby in accordance with the length of wire withdrawn; said control mechanism having operative connection with the said braking means whereby upon the withdrawal of a predetermined length of wire said control mechanism will effect application of said braking means to stop the wire supplying device.

In testimony whereof I affix my signature at Portland, Maine, this 12th day of May, 1926.

EMIL EK.